Patented Dec. 1, 1936

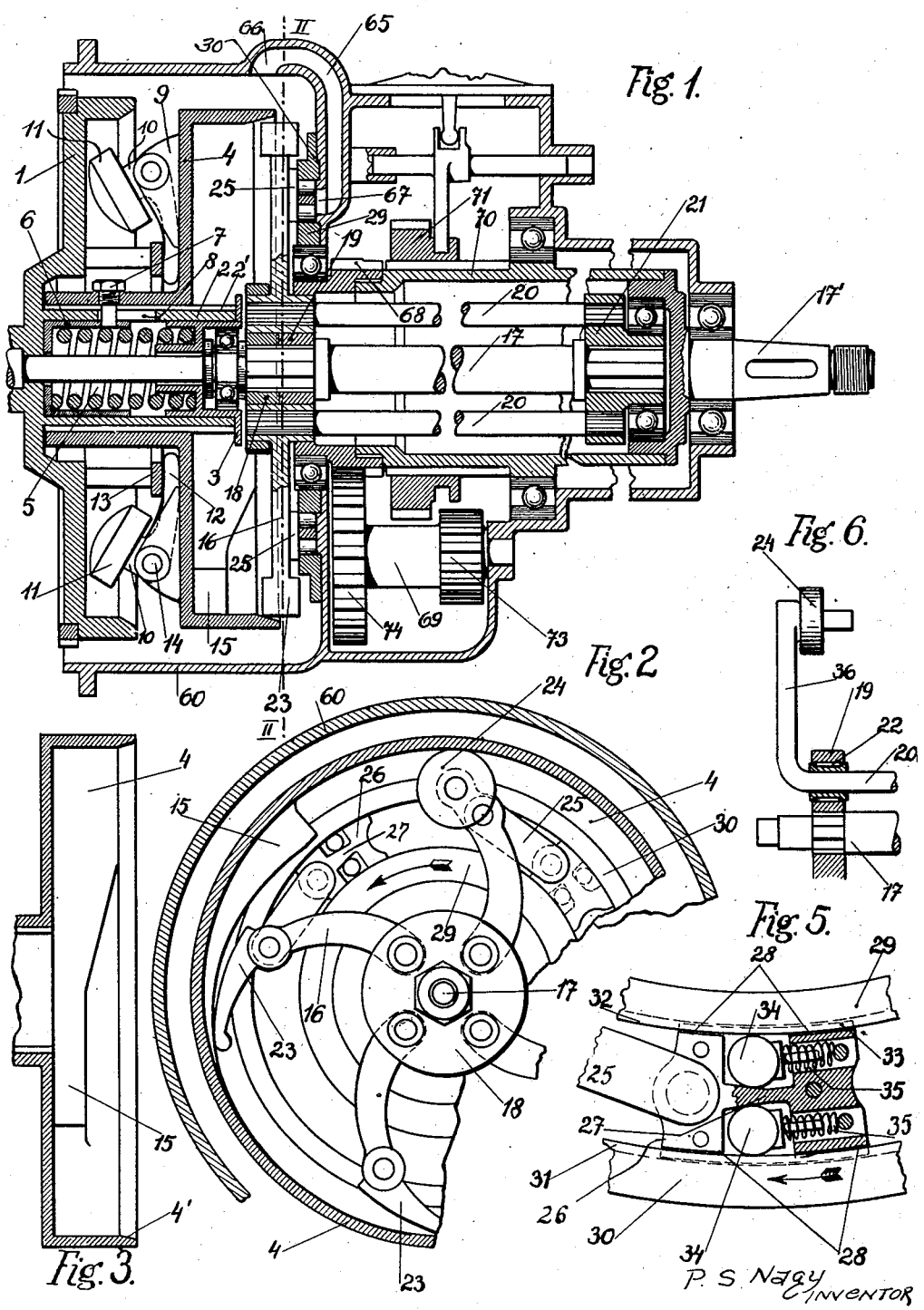

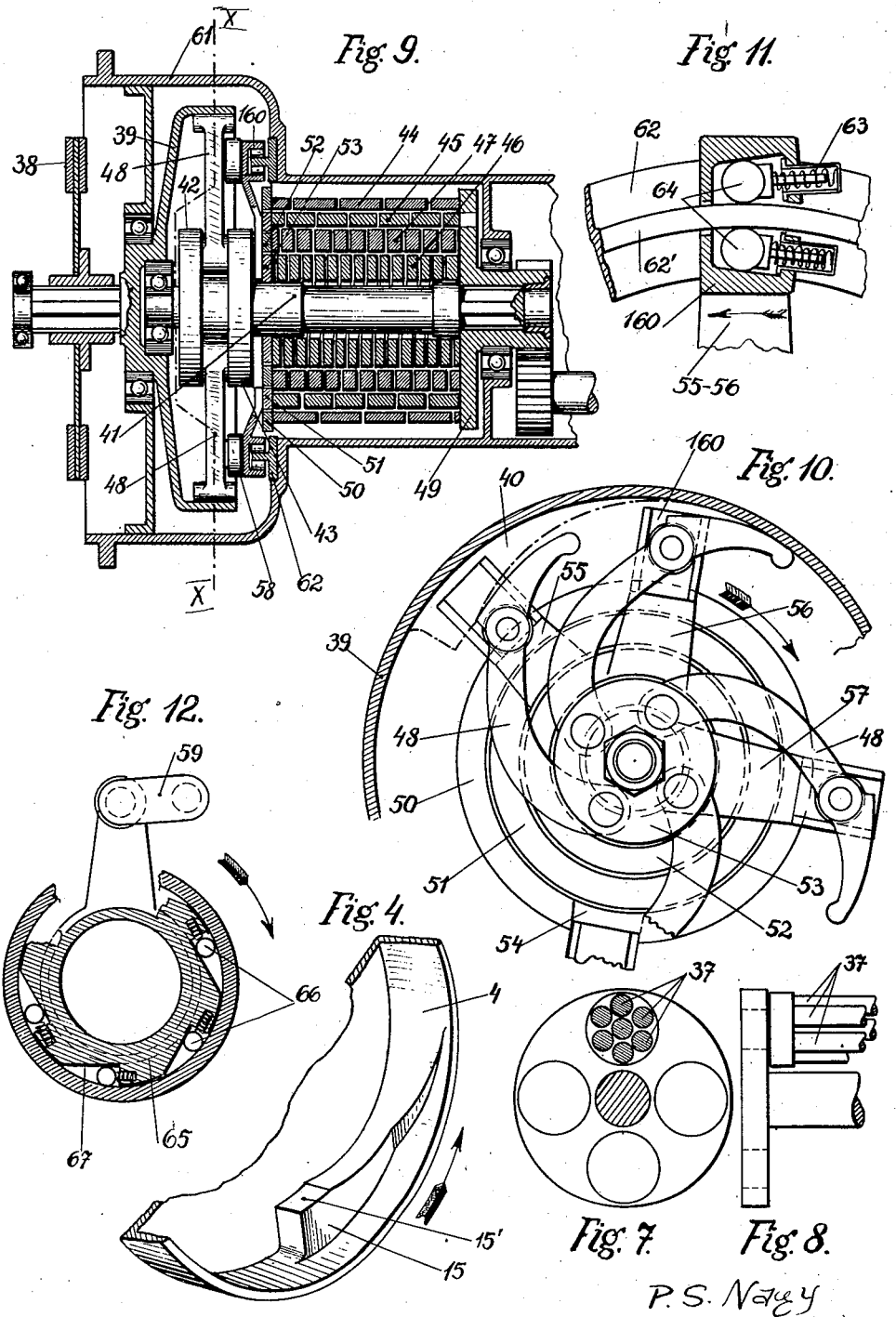

2,062,923

UNITED STATES PATENT OFFICE 2,062,923

INFINITELY VARIABLE TRANSMISSION

Pál Sándor Nagy, Budapest, Hungary, assignor of thirty per cent to Hella Csarada, Budapest, Hungary Application December 26, 1934, Serial No. 759,250
In Hungary December 30, 1933

5 Claims. (Cl. 74—114)

The invention has for its object to provide a mechanism for infinitely, i. e. continuously varying the ratio and moment between a driving and a driven element, which shows the advantages of automatic action, small weight, of safety and great efficiency, as well as of simple construction as compared with such devices known up till now.

The infinite variable speed transmission according to the invention is especially suitable for road vehicles driven by a gasoline or Diesel engine, and is adapted to transmit the power of said engine to the driving wheels and to multiply the moment of the engine according to the ratio of power transmission.

The variable speed transmission according to the invention substantially consists of springs of great efficiency arranged on the driven member, the free ends of such springs being connected to fixing devices and thus being movable in the direction of rotation of the motor only and not in the opposite direction. The springs come one after the other under the action of the driving member if the latter revolves more quickly than the driven member. Consequently, the springs will be stretched, whereby, on the one hand, they transfer the moment of the driving member to the driven member (shaft) and on the other hand, they store a certain working power. The springs, after being stretched, are delivered from the action of the driving member and are fixed at their free ends by the said fixing devices, whereafter they transfer the working power accumulated in them to the driven member.

The greater is the difference between the numbers of revolutions of the two shafts, the greater is the number of the springs acting at the same time upon the driven shaft. If there is no difference between the speeds of the two shafts, the power is transmitted by one compressed spring only.

Fig. 1 is a longitudinal section of one embodiment of the invention having axial torsion springs.

Fig. 2 is a section taken on line II—II of Fig. 1.

Fig. 3 is a longitudinal section of the cam drum of the construction shown in Fig. 1.

Fig. 4 is a partial perspective view of the same cam drum.

Fig. 5 shows the locking device of the construction according to Fig. 2 on an enlarged scale.

Fig. 6 is a partial view of a modified form of the axial torsion springs.

Fig. 7 shows a further form of said springs in cross section and

Fig. 8 the same in partial side elevation.

Fig. 9 shows by way of example and in longitudinal section another form of the invention having spiral springs.

Fig. 10 is a section taken on line X—X of Fig. 9.

Fig. 11 shows on an enlarged scale the locking device of the construction according to Fig. 10, said locking device constituting a modification of the device shown in Fig. 5.

Fig. 12 is a sectional view of a further form of the locking device.

Referring to the embodiment shown in Figs. 1 to 5, the flywheel 1 of the motor (not shown) has a cylindrical hub 2 (Fig. 1). In the axial grooves 2' of this hub is guided a cam drum 4, the stroke of which is limited at the right hand end by a stop member 3. Within the hub 2 is a compressed spiral spring 5, which is connected by the cylindrical extension of a spring plate 6 and by screw bolts 7 to the cam drum 4 and tends to move this drum towards the flywheel 1. In Fig. 1 the cam drum is shown in its left hand end position. For the connecting screws 7 longitudinal slots 8 are provided in the hub 2.

On the outer surface of the cam drum 4 crank levers 10 are pivotally mounted in bearings 9, one arm of each of said levers holding a fly weight 11. The other arm 12 of the levers bears against a ring 13 rigidly secured to the flywheel 1, so that if the flywheel is rotated and the cam drum 4 connected to it participates in its rotation, the weights 11 are driven outwardly by the centrifugal force and thus the levers 10 are turned by an angle which corresponds to the speed of rotation. As the arm 12 of the levers 10 bears against the ring 13, during the turning of the levers the cam drum 4 is shifted to the right against the action of spring 5.

The cam drum 4 has a cam 15 (see Figs. 1 to 4) which gradually slopes from the flange of said drum and at its highest part it is advantageously provided with a short concentric portion 15'. The highest part of this cam is narrower than its foot portion; in the preferred form shown on the drawings the higher half of the cam is of uniform width and the lower half is gradually widened towards the flange of the drum 4. This flange is still wider than the widest part of the cam, so that a totally cylindrical or conical edge 4' is formed on the cam drum.

The cam drum serves for transmitting the moment from flywheel 1 to the driven shaft 17 (Fig. 1) by means of driving arms 16 and torsion springs 20. These torsion springs are parallel with the driven shaft 17 and their rear end is secured to a plate 21 keyed to the shaft 17. The front end of the springs 20 is pivotally mounted in two plates 18 and 19 also secured to shaft 17, and each of these front ends is connected to one of the above mentioned driving arms 16. These arms are provided with rigidly secured gliding shoes 23 or pivoted rollers 24 (Fig. 2) adapted to ride on the cam 15. If the shoes 23 or rollers 24 do not touch the cam 15 but move on the edge 4' of the cam drum (Fig. 1), the springs 20 are not stretched and the cam drum may freely rotate together with flywheel 1, without transmitting any power to the driven shaft 17, this arrangement making superfluous the usual main clutch of the motor vehicles.

When the speed of rotation of the cam drum exceeds the idling speed the weights 11 are driven outwardly by the centrifugal force and the cam drum is shifted towards the driving arms 16, which engage the cam 15 and thus the power is transmitted from the driving shaft to the driven shaft 17 in a manner particularly described below.

Each of the driving arms 16 is connected by means of a rod 25 to a locking device the construction of which is similar to that of the known free wheel mechanisms. The locking device substantially consists of a slide 26 coupled to the said rod 25 and having an oblique middle portion 27. On each side of this middle portion a roller 34 is arranged which is pressed by a spring 35 towards the thicker end of the middle portion 27. The slide 26 is guided by strips 33 gliding in grooves 31 and 32 of two unmovable rings 29 and 30 fixed to the casing of the mechanism. The gliding surfaces of the slide are marked by the reference numeral 28. If one of the driving arms 16 is swung forwards by the cam 15 and thus the respective spring 20 is stretched, this arm pulls by connecting rod 25 the slide 26 in the direction of the arrow shown in Fig. 5, this movement of the slide necessitating only a very little pulling force. If, however, the driving arm 16 disengages the cam 15, the twisted spring 20 is unable to push the slide 26 in the opposite direction, as the rollers 34 are jambed between the oblique surface of the middle portion 27 and the ring 29 or 30 respectively. The purpose of this arrangement may be understood from the function of the mechanism set forth below.

The pressure of one of the rollers 34 exerted upon the oblique surface of the middle portion 27 is substantially the same as the pressure of the other roller, so that there is no radial force which would press the slide 26 to the rings 29 or 30 and would cause a choking up of this slide.

The mechanism is situated in a casing 60 (Fig. 1) filled with lubricating oil. A passage 65 serves to lead back the lubricating oil thrown out through the port 66 by the centrifugal force into the interior of the cam drum.

A modified form of the springs is shown in Fig. 6 according to which the driving arms 36 are made integral with the springs 20 which are mounted in roller bearings 22 fixed in the ring 19.

A further form of the torsion springs is shown in Figs. 7 and 8 in which each of the individual rods 20 of the embodiment according to Fig. 1 is replaced by a plurality of springs 37 having smaller diameter. In Fig. 7 some bundles of the springs 37 are indicated by simple circles. As torsion springs of smaller diameter can be turned by a greater angle than those of greater thickness and of the same length, or in order to attain the same angle of torsion the thinner springs can be made shorter, the arrangement according to Figs. 7 and 8 is advantageous if it is important to construct the mechanism as short as possible.

Let us suppose that the driven shaft 17 does not rotate and the driving shaft runs idle. If now the idling speed of the driving shaft is exceeded and the cam drum 4 shifted to the right in consequence of the weight 11 being moved outwardly by the centrifugal force, the lowest part of cam 15 engages the driving arms 16 one after the other. During the swinging of the arms 16 and stretching of the springs the slides 26 of the locking mechanism are pulled in the direction in which they can move freely. When the cam 15 disengages the shoe 23 or roller 24 of an arm 16, the respective spring 20 remains stretched, as the slide 26 cannot move in the opposite direction. In other words, a free slacking off of the spring is prevented, and thus the stretched springs tend to turn shaft 17, but if they are unable to do so, it is necessary to rotate quicker the cam drum 4 (that is to say to open the throttle if the cam drum is rotated by a gasoline engine) so that said drum is shifted still further to the right and the arms 16 engage a higher part of the cam 15 which causes an increased tensioning of the springs. The moment exerted upon the shaft 17 is thus increased till the resistance is overcome and said shaft begins to rotate. During the rotation of the driven shaft the tensioned springs are slacking off and transmit their energy to said shaft, but as the cam drum rotates still faster than the driven shaft, the springs are stretched one after the other by the cam 15.

If now a certain speed of the driven shaft is attained and the cam drum is rotated by less force (i. e. the engine is throttled) the cam drum is no more able to fully stretch the springs 20 and thus when one of the rollers 24 has attained a certain height on cam 15, the tension of the respective spring is not further increased, but the roller remains at this part of the cam, so that there is no difference in speed between the driving and driven shaft. Thus the parts of the mechanism do not move in respect to one another but act as an elastic coupling.

If now by any reason a greater moment is necessary to rotate the shaft 17, the throttle valve is closed for a few seconds and then opened, so that during the short period of throttling the roller 24 rolls down on cam 15 and when the engine begins to strongly work, the cam drum is again able to rotate faster than shaft 17. In this case the driven shaft is rotated at the same time by one spring which is being stretched and by one or more springs which are slacking off, so that the resultant force of the springs acting at the same time is practically always the same and thus the moment on the driven shaft is uniform.

If the shaft 17 becomes a driving one (for instance when descending a hill) one of the arms 16 is bearing against the radial end surface of cam 15 so that the shaft 17 rotates the cam drum.

The power is transmitted from shaft 17 to shaft 17' (Fig. 1) and therefrom to the axle of the motor car in any desired manner. According to Fig. 1 a gear 71, is shifted to the left from the position shown, couples the toothed projection 68 of the ring or plate 19 with a sleeve 70 which is rigidly secured to shaft 17'. If the gear 71 is shifted to the right, the power is transmitted through the counter shaft 69, which is advantageous when driving on very long inclined roads; namely when climbing, the use of the counter shaft 69 saves the mechanism according to the invention and when descending the braking performance of the motor is increased. By using a further intermediate gear (not shown) the direction of rotation of the driven shaft can be reversed.

A modified form of the invention is shown in Fig. 9, according to which instead of the axial rod-like springs, spiral springs 44, 45, 46 and 47 are employed, by which the length of the mechanism may be materially decreased. These spiral springs are of the same length but of different diameters and they are arranged within one another. In Fig. 9 the springs are shown in axial section, but in order to make the figure clearer, most of the short lines which would show the parts of the springs situated rearwards of the plane of the drawing, are omitted. In order that under the action of the same force the deformation of the springs should be the same, the springs of greater diameter have fewer turns and vice versa. The rear end of the springs is secured to a plate 49 keyed to the driven shaft 41, the front ends being connected to rings 50, 51, 52 and 53 pivoted within one another. Each of the rings is provided with an arm 54, 55, 56 and 57 respectively, connected to one of the driving arms 48. The driving arms 48 are pivotally mounted between two discs 42 and 43 keyed to the shaft 41. The connection between one of the arms 54 to 57 and the respective driving arm 48 is established by a slide 58 slidably mounted in the arm 54 (55 etc.) and pivotally mounted in the arm 48. This slide 58 replaces the connecting rod 25 of the embodiment set forth above.

The arms 54 to 57 are provided with a locking mechanism similar to that shown in Fig. 5 but differing from the latter in that the rollers 64 (Fig. 11) bear at their inner parts against an annular abutment 62' of a ring 62 fixed on the casing 61 of the mechanism, and at their outer parts against an oblique bearing surface of the casing 160 made integral with the arm itself. The springs controlling the rollers are marked 63.

The power of the engine is transmitted by a usual clutch, one half of which is shown at 38. This plate 38 is rigidly secured to the shaft of the cam drum, which is indicated in this form by the numeral 39. The cam drum 39 differs from the drum of the foregoing embodiment in that its cam 40 (Fig. 10) is along its whole length as wide as the cylindrical part of the cam drum. Thus a soft starting is made possible by a slow engaging of the coupling 38, but in other respects the function of this form of the invention is quite similar to that of the foregoing one.

Of course, various combinations of the different parts are possible, for instance spiral springs may cooperate with a cam drum according to Fig. 4, or rod-like springs with a clutch coupling, etc.

Fig. 12 shows a further form of the locking mechanism, in which each of the arms (not shown in this figure) is connected by short rods 59 to a ring 65 provided with spring controlled rollers 66 bearing on oblique surfaces 67 for the purpose specified.

I claim:

1. An automatic infinite variable speed transmission comprising in combination a rotating driving element; a driven element adapted to be rotated by said driving element with a number of revolutions not higher than that of the driving element; a plurality of torsion springs secured to said driven element at one of their ends, these springs being adapted to rotate together with the said driven element and to transmit the torque from the driving element to the driven element if twisted; arms on the said torsion springs at their end opposite to that secured to the driven element; a cam on the driving element adapted to twist said springs by means of the said arms, this cam being adapted to cooperate with one of the arms if the speeds of the driving and driven elements are equal and with several arms one after the other if the speed of the driven element is less; and a locking device adapted to prevent the twisted springs from a free slacking off after disengaging from said cam and thus enabling them to transmit their energy to the said driven element.

2. In an automatic infinite variable speed transmission, a driving element, a driven shaft adapted to be rotated by said driving element, rod like torsion springs arranged parallelly with said driven shaft, said springs being secured to said driven shaft and being adapted to transmit a torque onto the driven shaft if twisted, driving arms on said torsion springs at their end opposite to that secured to said driven element, a cam on the driving element adapted to twist said springs by engaging said driving arms, and a locking device connected to said driving arms and adapted to prevent the twisted springs from a free slacking off after the disengagement of said driving arms from said cam and thus enabling the springs to transmit their energy to the said driven shaft.

3. An automatic infinite variable speed transmission as claimed in claim 2 in which said torsion springs are arranged in groups forming bundles.

4. In an automatic infinite variable speed transmission, a driving element, a driven shaft adapted to be rotated by said driving element, plates keyed to said driven shaft, rod-like torsion springs arranged parallelly with said driven shaft and secured to one of said plates, said springs being pivotally mounted in another of said plates and being adapted to transmit a torque onto the driven shaft if twisted, driving arms on the pivoted ends of said torsion springs, a cam on the driving element adapted to twist said springs by engaging said driving arms, and a locking device connected to said driving arms and adapted to prevent the twisted springs from a free slacking off after the disengagement of said driving arms from said cam and thus enabling the springs to transmit their energy to the said driven shaft.

5. In an automatic infinite variable speed transmission, a driving drum, a driven element adapted to be rotated by said drum, torsion springs on said driven element adapted to rotate therewith and to transmit a torque onto the driven element if twisted, arms on the said torsion springs for twisting these springs, a cam on said driving drum adapted to twist said springs by means of said arms, the lower part of said cam being wider than the higher part, fly weights rotated by said driving drum and adapted to shift the cam drum towards said arms for making them engage said cam if the driving drum is accelerated, and a locking device adapted to prevent the twisted springs from a free slacking off after disengaging from said cam and thus enabling them to transmit their energy to the said driven element.

PÁL SÁNDOR NAGY.